No. 656,956.  
C. EIBEE.  
PIPE COUPLING.  
(Application filed July 14, 1899.)  
Patented Aug. 28, 1900.

(No Model.)  
2 Sheets—Sheet 1.

WITNESSES:  
Geo. W. Naylor

INVENTOR  
Carl Eiber  
BY  
ATTORNEYS

No. 656,956. Patented Aug. 28, 1900.
C. EIBEE.
PIPE COUPLING.
(Application filed July 14, 1899.)
(No Model.) 2 Sheets—Sheet 2.
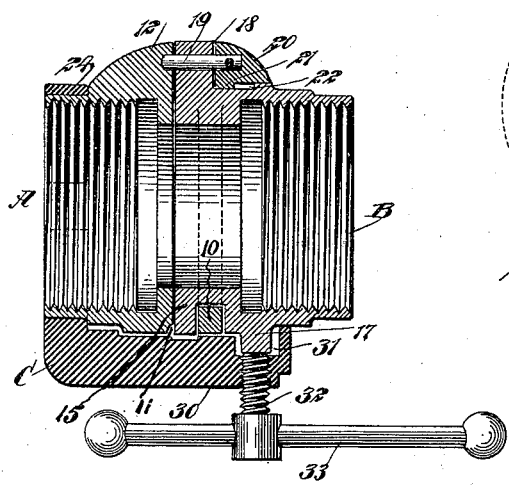
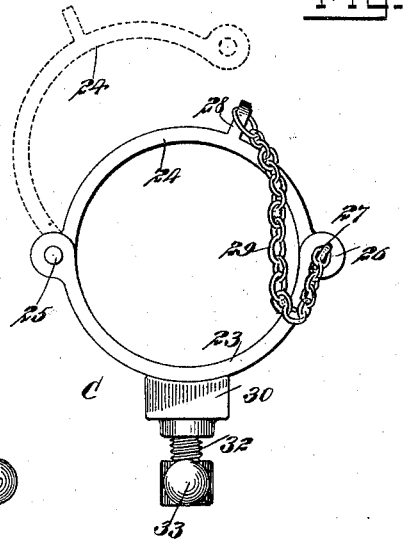
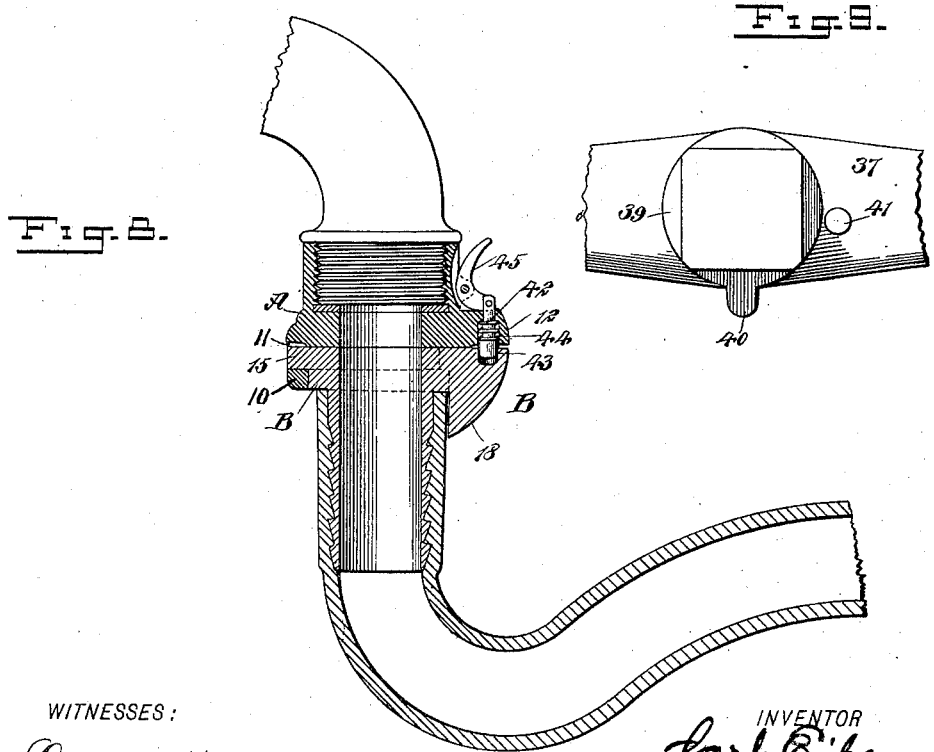
WITNESSES:
INVENTOR
Carl Eibee
BY
ATTORNEYS

UNITED STATES PATENT OFFICE.

CARL EIBEE, OF NEW YORK, N. Y.

PIPE-COUPLING.

SPECIFICATION forming part of Letters Patent No. 656,956, dated August 28, 1900.

Application filed July 14, 1899. Serial No. 723,838. (No model.)

*To all whom it may concern:*

Be it known that I, CARL EIBEE, of the city of New York, borough of Brooklyn, in the county of Kings and State of New York, have invented a new and Improved Pipe-Coupling, of which the following is a full, clear, and exact description.

My invention relates to a pipe-coupling adapted for connecting sections of hose or for connecting a hose to a hydrant or other source of water-supply.

The object of the invention is to provide a simple yet effective structure whereby a coupling-section and a mating section may be quickly locked together and rendered water or fluid proof where they connect and as quickly and conveniently separated under all conditions of weather.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
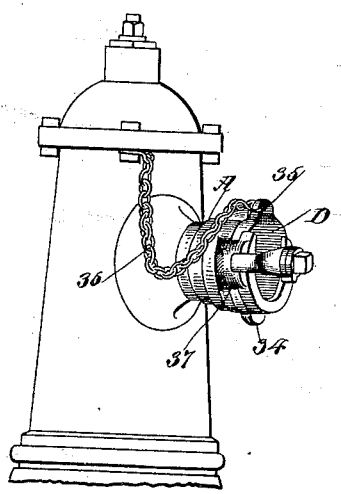
Figure 2:
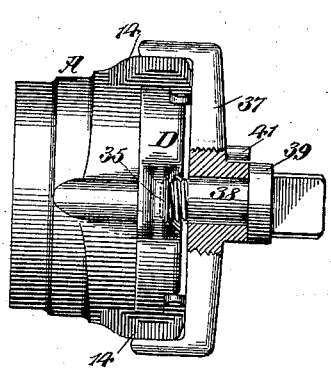
Figure 3:
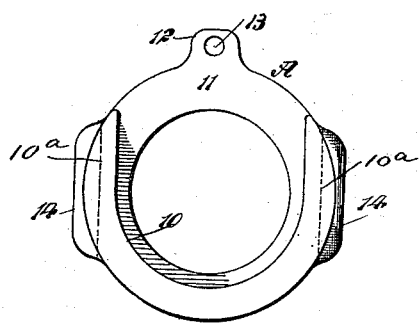
Figure 4:
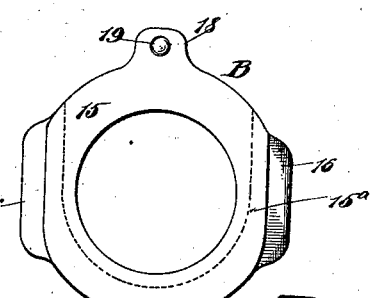
Figure 5:
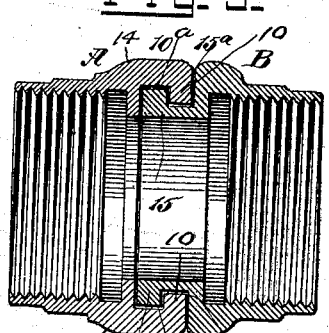
Figure 10:
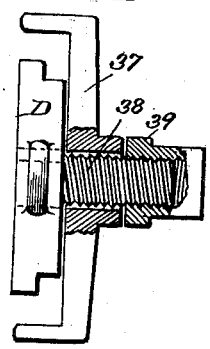

Figure 1 is a perspective view of the improved coupling attached to a hydrant. Fig. 2 is a plan view of the coupling adapted for use on a hydrant, a portion of the clamp used in connection therewith being broken away. Fig. 3 is a face view of one coupling-head for a hose. Fig. 4 is a face view of the mating coupling-head. Fig. 5 is a horizontal section through the two coupling-heads when united. Fig. 6 is a vertical section through the united coupling-heads, illustrating the application thereto of a separating device, which device is in section. Fig. 7 is an end view of the separating device shown in Fig. 6. Fig. 8 is a section through a modified form of the coupling especially adapted for attachment to a faucet; and Fig. 9 is a side elevation of the central portion of the clamp shown in Figs. 1 and 2, the view being drawn on an enlarged scale.

When the coupling is to be used to unite or connect two sections of hose, two coupling-heads A and B are employed. A U-shaped flange or bar 10 is offset from the front face of the coupling-head A, being connected with said face at opposite sides by cheek-pieces 14, whose outer surfaces extend beyond the outer side portions of the coupling-head, as shown in Fig. 3. Thus an opening 11 is formed at the bottom of the head A, between the flange 10 and front face of the head, and slideways 10ª are obtained at the sides of the head. A hood 12 is constructed at the upper front portion of the head A, the front face of which is in the same plane with the front face of the coupling-head, and a recess 13 is produced in the front face of the hood. The mating coupling-head B is provided with a transverse tongue 15 at its front face, formed by producing a U-shaped recess 15ª in the exterior of the head B at the sides and bottom, as shown in dotted lines in Fig. 4 and in positive lines in Fig. 5. In coupling the tongue 15 of the head B enters the slideways 10ª in the opening 11 in the head A, while at the same time the flange 10 of the coupling-head A is received in the groove 15ª of the head B. The coupling-head B is also provided with exterior offset side faces 16, which strengthen the head and mate with the cheek-pieces 14. A hood 18 is formed upon the upper portion of the coupling-head B, adapted to mate with the hood 12, the front face of the hood 18 being flat and in the same plane with the front face of the coupling-head B, and in the hood 18 a pin 19 has horizontal movement, adapted, when the two heads are coupled, to enter the recess 13 of the hood 12, as shown in Fig. 6. This pin is attached to a thumb-piece 20, having an offset 21 upon its under face, adapted to slide in a groove 22 in the upper portion of the body of the coupling-head B, as is shown in Fig. 6. The coupling-head B is also provided with an exterior lug 17 at its bottom just back of the groove 15ª, and this lug is adapted to assist in the uncoupling of the two heads when secured together in the event the weather is exceedingly cold or in the event the two heads should become too tightly interlocked. In such an event it is simply necessary to strike the lug 17 upon a firm surface, whereupon the tongue 15 will be driven upward and out from the groove 10, the pin 19 having been disconnected from the head A.

Under some circumstances it is necessary to provide a releasing device to effectually and quickly separate the coupled or mating members of the coupling. Such a device C is shown in Figs. 6 and 7 and consists of a ring-body comprising, preferably, a lower section 23 and an upper section 24, the two sections having a hinged connection 25 at one end, terminating at the opposite ends in interlocking apertured knuckles 26, and a pin 27 is passed through the apertures of these knuckles 26 to convert said body into a clamping-ring. The pin 27 is connected with a lug 28 upon the upper member of the body by means of a suitable chain 29. The shank or bottom portion of the releasing device C consists of a single angle-arm 30, the upright portion of the arm being secured to the ring-body, and the said arm 30 is adapted to fit to the under surface of the coupled heads A and B. The horizontal portion of the arm 30 terminates in a socket 31, into which socket the lug 17 of the head B is made to enter, and the releasing device is held on the head A by means of a ring-body 23 24, which is located around the sleeve portion of the head. A screw 32 is made to enter the arm 30 of the releasing device and engage with the bottom of the lug 17, the said screw being provided with a bar 33 in order that it may be readily turned. Thus it will be observed that by turning the screw 32 in a suitable direction, the latch 19 having been drawn from engagement with the head A, the tongue 15 of the head B may be forced out from the slideways 10ª of the head A.

In Figs. 1 and 2 I have illustrated a coupling especially adapted for attachment to hydrants. This coupling consists of a head A, constructed practically as set forth and shown in Fig. 3; but instead of the groove 10 receiving a tongue 15 the said groove receives a gate or slide D, which is the equivalent of the said tongue 15, as shown in Fig. 1. This gate or slide is attached to the hydrant by means of a suitable chain 36, so that the gate or slide cannot be lost. When the gate or slide is in position on the head A, the water cannot escape from the hydrant and the gate is firmly held in position by a yoke 37, which engages with the outer faces of the cheek-pieces 14 of the head A, as shown in Fig. 2. A screw 38 is loosely passed through the central portion of this yoke, being screwed or otherwise securely fastened to the central portion of the gate D. The head 39 of this screw is in the form of a nut, and the nut is provided with a lug 40, adapted for engagement with a pin or offset 41, forming a portion of the yoke, as is shown in Figs. 2 and 9. The nut 39 is first placed in position upon the outer end of the screw 38, the yoke 37 is then slipped upon the screw, and, lastly, the screw is secured to the gate D. The lug 40 on the nut 39 bears such relation to the pin 41 on the yoke that the nut can be given almost one complete turn, and therefore cannot be removed from the screw and lost when the parts have been assembled. When the nut 39 has been turned in one direction, the yoke can move on the screw sufficiently to permit the end members of the yoke being free from clamping engagement with the cheek-pieces 14, and the gate may therefore be entered into or removed from the slideways 10ª of the coupling-head. When the gate is in position and the nut 39 is screwed inward or in opposition to its releasing movement, the nut will force the yoke in direction of the coupling-head and cause its end members to be brought into clamping or binding engagement with the outer surfaces of the cheeks 14. It is not necessary that a watertight connection be preserved between the gate D and the head A, as when the gate is in closed position the water is turned off at the hydrant. The gate D simply acts to close the nozzle of the hydrant, and the yoke and its screw serve the purpose of retaining the gate in place. In fact, the gate D is a substitute for a cap and can be more readily removed than the ordinary cap and being connected with the hydrant or its nozzle in the manner described is not liable to be lost.

In Fig. 8 I have illustrated a slight modification, the coupling here shown being especially adapted for attachment to the threaded portion of a faucet. The only difference consists in a different form of latch and means for operating the latch. In this instance the latch consists of a pin 42 having a large head 43, the pin being adapted to slide in a suitable opening in the hood 12 of the coupling head A, and the head of the pin enters a recess in the hood 18 of the coupling-head B. The pin 42 is held in locking engagement with the coupling-head B by means of a spring 44, coiled around the reduced portion of the pin, and a lever 45, fulcrumed upon the outer surface of the sleeve portion of the coupling-head A, is pivotally attached to the pin 42, and by moving the lever 45 toward the sleeve of the coupling-head A the pin 42 is withdrawn from engagement with the mating head B.

The gate or slide D is provided with an upper lug 35, to which the chain 36 is attached, and a lower lug 34, which corresponds to the lug 17 on the coupling-head B, which lug 34 may be tapped by a hammer or an equivalent device should the gate or slide refuse to move from the head when ordinary force is brought to bear upon it.

Having thus described my invention, I claim as new and desire to secure by Letters Patent—

1. The combination of a coupling-section, and a mating section having a transverse tongue-and-grooved connection, one of said parts having an exterior projecting surface adapted for use when the sections are to be uncoupled, one of said sections being also provided with exterior surfaces to be engaged by a yoke, for the purpose set forth.

2. The combination of a coupling-section and a mating section, said parts having a transverse tongue-and-grooved connection, the section provided with the tongue having an offset bottom surface adapted for use when the sections are to be uncoupled, the other section having offset faces adapted to be engaged by a clamping device and a latch connection between the two sections, as and for the purpose specified.

3. The combination, with a coupling-section and a mating section, said parts having a transverse tongue-and-grooved connection, one of the said parts having an exteriorly-projected surface adapted for use when the sections are to be uncoupled, of a releasing device consisting of a ring-body fitted to the section mating with that having the said exteriorly-projected surface, and an arm connected with the body, provided with a socket to receive said exteriorly-projected surface, together with a screw carried by the said arm and arranged for engagement with the said projected surface of the coupling-section, for the purpose specified.

CARL EIBEE.

Witnesses:
J. FRED. ACKER,
JNO. M. RITTER.